United States Patent [19]

Shibuya et al.

[11] Patent Number: 5,699,256
[45] Date of Patent: Dec. 16, 1997

[54] OFFSET-DRIFT CORRECTING DEVICE FOR GYRO-SENSOR

[75] Inventors: Kazuo Shibuya, Yokohama; Tsuyoshi Okada, Yokosuka, both of Japan

[73] Assignee: Matsushita Electric Industrial Co., Ltd., Osaka, Japan

[21] Appl. No.: 457,533

[22] Filed: Jun. 1, 1995

[30] Foreign Application Priority Data

Jun. 2, 1994 [JP] Japan ................... 6-121606

[51] Int. Cl.$^6$ .................. G06F 165/00; G01C 21/20
[52] U.S. Cl. ............... 364/453; 364/449.8; 364/449.95; 364/450; 33/318; 33/326; 74/5.4
[58] Field of Search ................... 364/453, 450, 364/454, 449.95, 565, 571.02, 571.03, 449.8; 74/5.4, 5.8, 5.9; 33/318, 324, 326, 327; 73/503.3, 1 E

[56] References Cited

U.S. PATENT DOCUMENTS

| | | | |
|---|---|---|---|
| 5,235,514 | 8/1993 | Matsuzaki | 364/454 |
| 5,270,959 | 12/1993 | Matsuzaki et al. | 364/571.02 |
| 5,331,563 | 7/1994 | Masumoto et al. | 364/449.1 |
| 5,424,953 | 6/1995 | Masumoto et al. | 340/988 |
| 5,469,158 | 11/1995 | Morita | 340/988 |

FOREIGN PATENT DOCUMENTS

| | | |
|---|---|---|
| 0488594 | 6/1992 | European Pat. Off. |
| 0541224 | 5/1993 | European Pat. Off. |
| 3-209170 | 9/1991 | Japan |
| 3209170 | 9/1991 | Japan |

Primary Examiner—Kevin J. Teska
Assistant Examiner—Tan Q. Nguyen
Attorney, Agent, or Firm—Pollock, Vande Sande & Priddy

[57] ABSTRACT

An offset-drift correcting device is designed for a gyro-sensor mounted on an object and outputting a signal representing an angular speed of the object. The device includes a first section for detecting whether or not the object is rotating. A second section connected to the gyro-sensor is operative for smoothing the angular speed represented by the output signal of the gyro-sensor, and deriving an average angular speed of the object from the angular speed represented by the output signal of the gyro-sensor. A third section connected to the first section and the second section is operative for estimating an offset level of the output signal of the gyro-sensor in response to the average angular speed derived by the second section in cases where the first section detects that the object is not rotating. The third section includes an adaptive filter processing an output signal of the second section which represents the derived average angular speed. A fourth section connected to the gyro-sensor and the third section is operative for subtracting the offset level estimated by the third section from the output signal of the gyro-sensor to convert the output signal of the gyro-sensor into an offset-free signal.

6 Claims, 10 Drawing Sheets

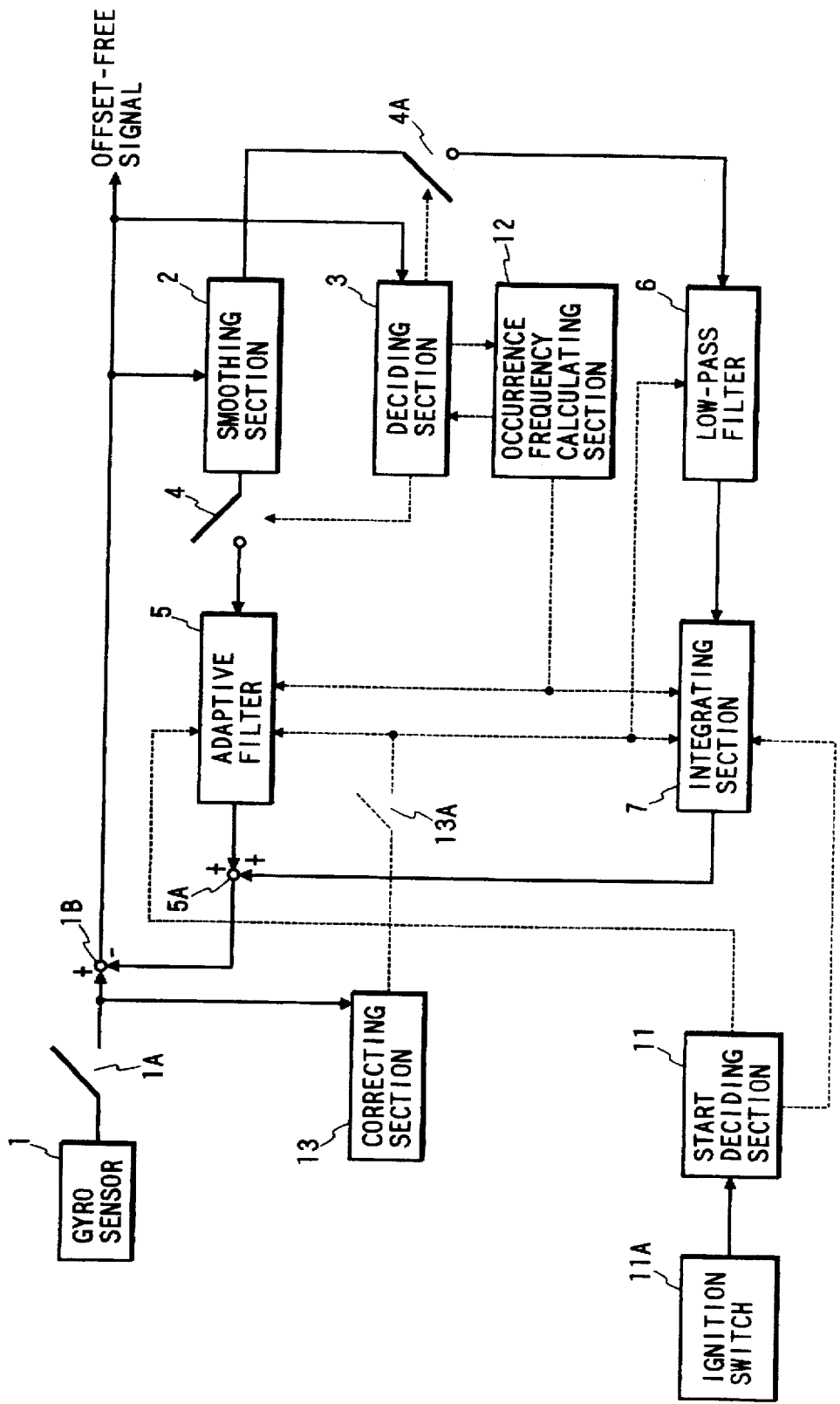

OFFSET-DRIFT CORRECTING DEVICE FOR GYRO-SENSOR

BACKGROUND OF THE INVENTION

1. Field of the Invention

This invention relates to an offset-drift correcting device for a gyro-sensor used in, for example, a car navigation system (an automotive navigation system).

2. Description of the Prior Art

Some car navigation systems (automotive navigation systems) include gyro-sensors for detecting angular velocities of car bodies (vehicle bodies). Generally, the output signal of a gyro-sensor has offset components in addition to detected information components. To accurately derive detected information from the output signal of the gyro-sensor, it is necessary to cancel the offset components in the gyro-sensor output signal.

In a car navigation system, the amount of offset in the output signal of a gyro-sensor tends to be drifted by various causes. A prior-art device for canceling the signal offset can not adequately follow certain types of drift of the signal offset.

SUMMARY OF THE INVENTION

It is an object of this invention to provide an improved offset-drift correcting device for a gyro-sensor.

A first aspect of this invention provides an offset-drift correcting device for a gyro-sensor mounted on an object and outputting a signal representing an angular speed of the object, the device comprising first means for detecting whether or not the object is rotating; second means connected to the gyro-sensor for smoothing the angular speed represented by the output signal of the gyro-sensor, and deriving an average angular speed of the object from the angular speed represented by the output signal of the gyro-sensor; third means connected to the first means and the second means for estimating an offset level of the output signal of the gyro-sensor in response to the average angular speed derived by the second means in cases where the first means detects that the object is not rotating, wherein the third means comprises an adaptive filter processing an output signal of the second means which represents the derived average angular speed; and fourth means connected to the gyro-sensor and the third means for subtracting the offset level estimated by the third means from the output signal of the gyro-sensor to convert the output signal of the gyro-sensor into an offset-free signal.

A second aspect of this invention provides an offset-drift correcting device for a gyro-sensor mounted on an object and outputting a signal representing an angular speed of the object, the device comprising first means for detecting whether or not the object is rotating; second means connected to the gyro-sensor for smoothing the angular speed represented by the output signal of the gyro-sensor, and deriving an average angular speed of the object from the angular speed represented by the output signal of the gyro-sensor; third means connected to the second means for calculating an amount of temporal variation in the average angular speed derived by the second means, wherein the third means comprises a low pass filter processing an output signal of the second means which represents the average angular speed; fourth means connected to the third means for integrating an output signal of the third means which represents the calculated amount of temporal variation, and outputting a signal representing a result of the integrating; fifth means connected to the first means and the second means for estimating a first offset level of the output signal of the gyro-sensor in response to the average angular speed derived by the second means in cases where the first means detects that the object is not rotating, wherein the fifth means comprises an adaptive filter processing the output signal of the second means which represents the derived average angular speed; sixth means connected to the fourth means and the fifth means for combining the result of the Integrating by the fourth means and the first offset level estimated by the fifth means into a second estimated offset level of the output signal of the gyro-sensor; and seventh means connected to the gyro-sensor and the sixth means for subtracting the second estimated offset level provided by the sixth means from the output signal of the gyro-sensor to convert the output signal of the gyro-sensor into an offset-free signal.

A third aspect of this invention provides an offset-drift correcting device for a gyro-sensor mounted on an object and outputting a signal representing an angular speed of the object, the device comprising first means for estimating an angular speed of the object; second means for subtracting the angular speed estimated by the first means from the angular speed represented by the output signal of the gyro-sensor, and outputting a signal representing a result of the subtracting; third means connected to the second means for smoothing the output signal of the second means, and outputting a signal representing a result of the smoothing; fourth means connected to the third means for estimating an offset level of the output signal of the gyro-sensor in response to the output signal of the third means, wherein the fourth means comprises an adaptive filter processing the output signal of the third means; and fifth means connected to the gyro-sensor and the fourth means for subtracting the offset level estimated by the fourth means from the output signal of the gyro-sensor to convert the output signal of the gyro-sensor into an offset-free signal.

A fourth aspect of this invention is based on the second aspect thereof, and provides an offset-drift correcting device further comprising eighth means for detecting whether or not the gyro-sensor starts to be powered; and ninth means connected to the fourth means, the adaptive filter, and the eighth means for modifying characteristics of the integrating by the fourth means and characteristics of the adaptive filter during a predetermined time following a moment at which the eighth means detects that the gyro-sensor starts to be powered.

A fifth aspect of this invention is based on the second aspect thereof, and provides an offset-drift correcting device further comprising eighth means for detecting a frequency of occurrence of updating of the first offset level estimated by the fifth means; and ninth means connected to the first means, the adaptive filter, and the eighth means for modifying characteristics of the detecting by the first means and characteristics of the adaptive filter in response to the frequency detected by the eighth means.

A sixth aspect of this invention is based on the second aspect thereof, and provides an offset-drift correcting device further comprising eighth means for determining desired initial conditions of the adaptive filter in response to the output signal of the gyro-sensor; and ninth means connected to the adaptive filter and the eighth means for setting the adaptive filter into the desired initial conditions determined by the eighth means when the adaptive filter starts to operate.

A seventh aspect of this invention provides an offset-drift correcting device for a gyro-sensor mounted on an object and outputting a signal representing an angular speed of the object, the device comprising first means for detecting whether or not the object is rotating; second means connected to the gyro-sensor for smoothing the angular speed represented by the output signal of the gyro-sensor, and deriving an average angular speed of the object from the angular speed represented by the output signal of the gyro-sensor; third means connected to the second means for calculating an amount of temporal variation in the average angular speed derived by the second means, wherein the third means comprises a low pass filter processing an output signal of the second means which represents the average angular speed; fourth means connected to the third means for integrating an output signal of the third means which represents the calculated amount of temporal variation, and outputting a signal representing a result of the integrating; fifth means connected to the first means and the second means for estimating a first offset level of the output signal of the gyro-sensor in response to the average angular speed derived by the second means in cases where the first means detects that the object is not rotating, wherein the fifth means comprises an adaptive filter processing the output signal of the second means which represents the derived average angular speed; sixth means connected to the fourth means and the fifth means for combining the result of the integrating by the fourth means and the first offset level estimated by the fifth means into a second estimated offset level of the output signal of the gyro-sensor; seventh means connected to the gyro-sensor and the sixth means for subtracting the second estimated offset level provided by the sixth means from the output signal of the gyro-sensor to convert the output signal of the gyro-sensor into an offset-free signal; eighth means for detecting whether or not the gyro-sensor starts to be powered; ninth means connected to the fourth means, the adaptive filter, and the eighth means for modifying characteristics of the integrating by the fourth means and characteristics of the adaptive filter during a predetermined time following a moment at which the eighth means detects that the gyro-sensor starts to be powered; tenth means for detecting a frequency of occurrence of updating of the first offset level estimated by the fifth means; eleventh means connected to the first means, the adaptive filter, and the tenth means for modifying characteristics of the detecting by the first means and the characteristics of the adaptive filter in response to the frequency detected by the tenth means; twelfth means for determining desired initial conditions of the adaptive filter in response to the output signal of the gyro-sensor; and thirteenth means connected to the adaptive filter and the twelfth means for setting the adaptive filter into the desired initial conditions determined by the twelfth means when the adaptive filter starts to operate.

BRIEF DESCRIPTION OF THE DRAWINGS

FIG. 11 is a flow diagram of the function of an offset-drift correcting device according to a seventh embodiment of this invention.

DESCRIPTION OF THE PREFERRED EMBODIMENTS

Figure 1:
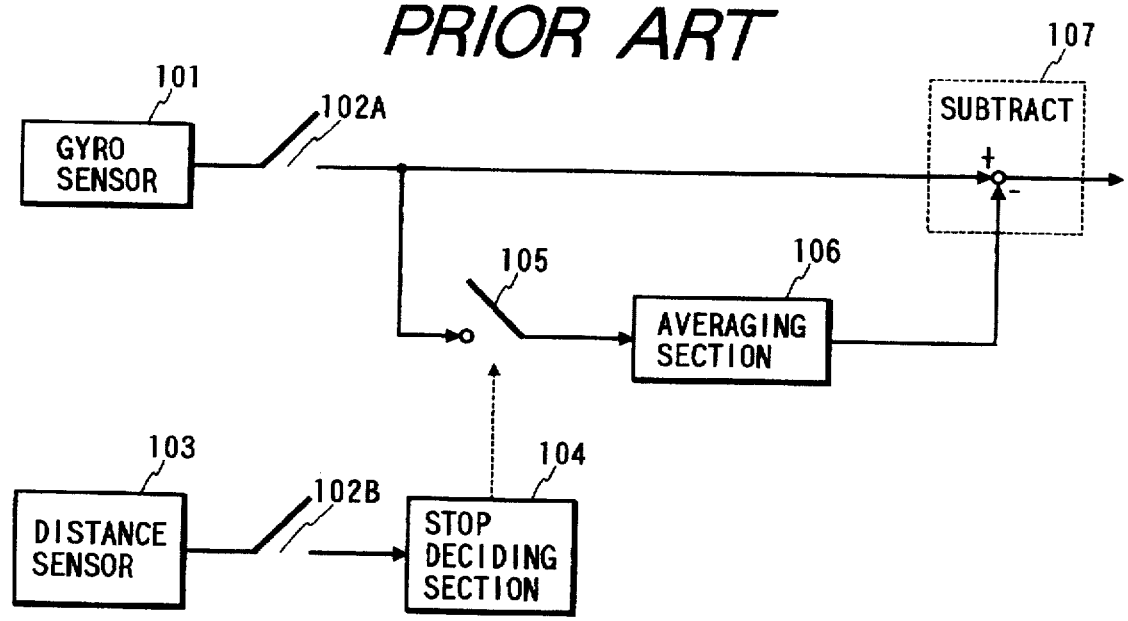
FIG. 1 is a flow diagram of the function of a prior-art offset correcting device.

First, a prior-art device will be described for a better understanding of this invention. FIG. 1 shows a prior-art offset correcting device for a gyro-sensor 101 in a car navigation system.

With reference to FIG. 1, the gyro-sensor 101 is mounted on a car body (not shown). The gyro-sensor 101 outputs a signal representing the angular speed or the angular rate of the car body. The prior-art offset correcting device includes a sampler 102A which periodically samples the output signal of the gyro-sensor 101 in response to a sampling clock signal generated by a suitable circuit (not shown). The sampling-resultant signal is fed from the sampler 102A to a switch 105 and a subtracter 107.

A distance sensor 103 mounted on the car body outputs a signal representing the distance travelled by the car body. The prior-art offset correcting device includes a sampler 102B which periodically samples the output signal of the distance sensor 103 in response to the sampling clock signal. The sampling-resultant signal is fed from the sampler 102B to a stop deciding section 104.

The samplers 102A and 102B determine timings of operation of the prior-art offset correcting device.

The stop deciding section 104 determines whether the car body is currently stationary or moving by referring to the output signal from the sampler 102B. The stop deciding section 104 generates a switch control signal depending on the result of the determination as to whether the car body is currently stationary or moving. The stop deciding section 104 outputs the switch control signal to the switch 105.

The switch 105 is connected between the sampler 102A and an averaging section 106. The switch 105 is opened and closed in response to the switch control signal fed from the stop deciding section 104. When the stop deciding section 104 finds the car body to be currently stationary, the switch control signal closes the switch 105 so that the output signal from the sampler 102A is transmitted to the averaging section 106. When the stop deciding section 104 finds the car body to be currently moving, the switch control signal opens the switch 105 so that the transmission of the signal from the sampler 102A to the averaging section 106 is inhibited.

In the case where the car body remains stationary, that is, in the case where the switch 105 remains closed, the averaging section 106 temporally averages the output signal from the sampler 102A during a preset interval of time. The averaging-resultant signal is held by a memory within the averaging section 106. The averaging-resultant signal can be continuously fed from the averaging section 106 to the subtracter 107 as a signal representing offset components of the output signal from the sampler 102A. In general, each time the car body stops, the averaging section 106 updates the offset-representing signal. Furthermore, in the case where the car body remains stationary for a long time, the averaging section 106 periodically updates the offset-representing signal.

When the car body starts to move, the switch 105 is opened by the switch control signal fed from the stop deciding section 104. In this case, the transmission of the signal from the sampler 102A to the averaging section 106 is inhibited. On the other hand, the latest offset-representing signal continues to be fed from the averaging section 106 to the subtracter 107.

The subtracter 107 subtracts the offset-representing signal from the output signal of the sampler 102A, thereby canceling offset components of the output signal of the sampler 102A. The subtracter 107 outputs the subtraction-resultant signal as an offset-free signal indicating the angular speed of the car body.

As long as the car body moves or creeps, the offset-representing signal remains unchanged. Therefore, even in the case where the car body remains moving or creeping for a long time, the offset-representing signal continues to be not updated. Since the offset components of the output signal from the sampler 102A tend to vary in such a long time, the accuracy of the offset-representing signal generally decreases as time goes by in the case where the offset-representing signal continues to be not updated. The decrease in the accuracy of the offset-representing signal results in a decrease in the accuracy of the offset-free signal indicating the angular speed of the car body.

First Embodiment

Figure 2:
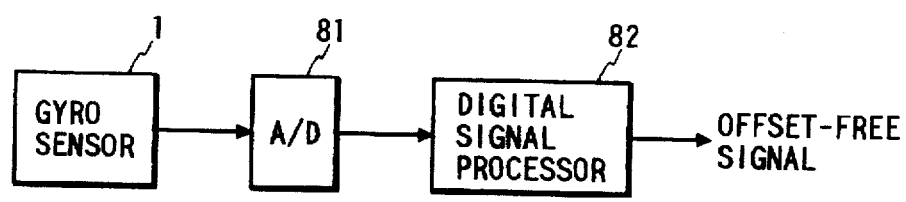
FIG. 2 is a block diagram of an offset-drift correcting device according to a first embodiment of this invention.

A first embodiment of this invention will be described hereinafter. FIG. 2 shows an offset-drift correcting device for a gyro-sensor 1 in a car navigation system.

With reference to FIG. 2, the gyro-sensor 1 is mounted on a car body (not shown). The gyro-sensor 1 outputs an analog signal representing the angular speed or the angular rate of the car body. The offset-drift correcting device includes an analog-to-digital (A/D) converter 81 and a digital signal processor 82. The A/D converter 81 periodically samples the analog output signal of the gyro-sensor 1, and converts every sample into a corresponding digital signal piece. The A/D converter 81 outputs the resultant digital signal to the digital signal processor 82. The digital signal processor 82 processes the digital output signal of the A/D converter 81 into an offset-free digital signal representing the angular speed of the car body.

The digital signal processor 82 estimates offset components of the digital output signal of the A/D converter 81, and subtracts the estimated offset components from the digital output signal of the A/D converter 81. The digital signal processor 82 outputs the subtraction-resultant signal as the offset-free digital signal.

The digital signal processor 82 includes a combination of an interface circuit (an input/output circuit), a processing section, a RAM, and a ROM. The digital signal processor 82 operates in accordance with a program stored in the ROM.

Figure 3:
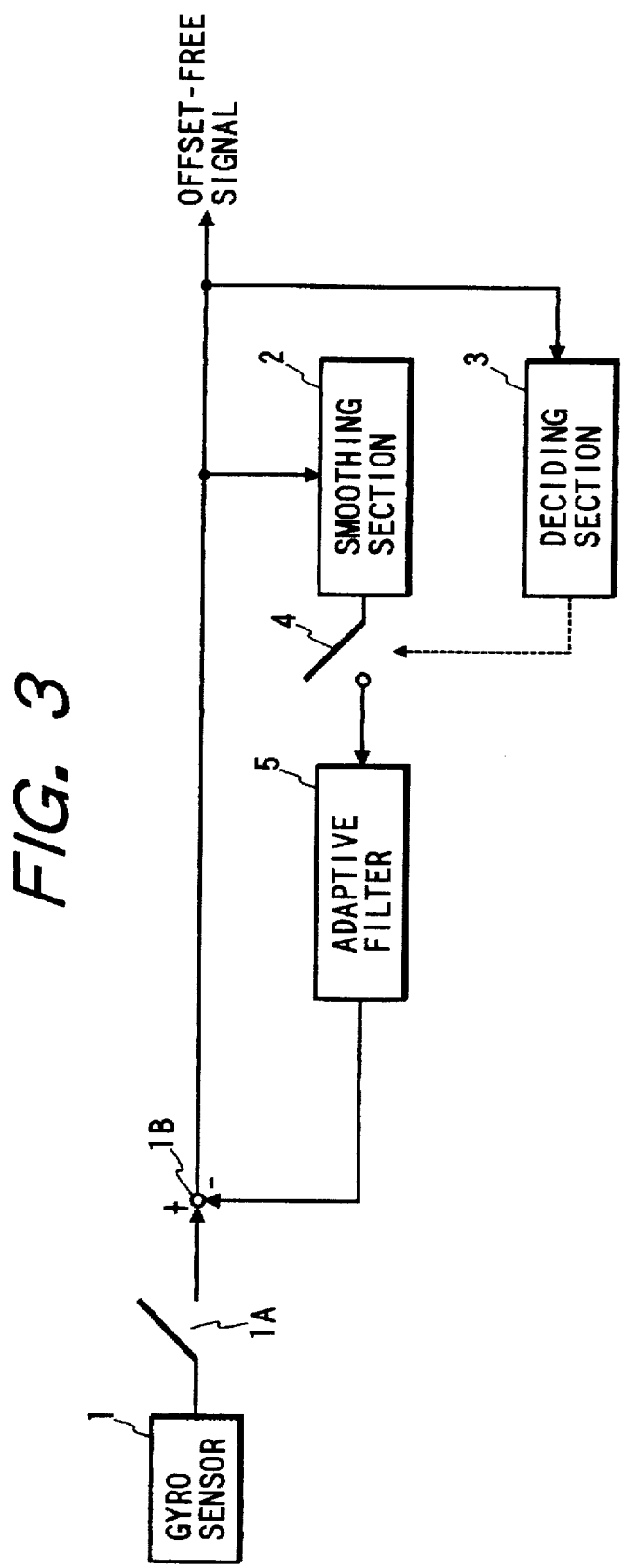
FIG. 3 is a flow diagram of the function of the offset-drift correcting device according to the first embodiment.

FIG. 3 is a flow diagram of the function of the offset-drift correcting device which is determined by the above-indicated program. It should be noted that FIG. 3 does not directly show the hardware of the offset-drift correcting device. It is a common practice in the art to use such a function flow diagram in explaining a signal processing device.

With reference to FIG. 3, a sampling section 1A periodically samples the output signal of the gyro-sensor 1 in response to a sampling clock signal generated by a suitable circuit (not shown). The sampling section 1A corresponds to the A/D converter 81 in FIG. 2. The sampling-resultant signal is fed from the sampling section 1A to a subtracting section 1B.

The subtracting section 1B receives a signal from an adaptively filtering section 5 which represents estimated offset components of the output signal of the sampling section 1A. The subtracting section 1B subtracts the offset-representing signal from the output signal of the sampling section 1A, thereby canceling offset components of the output signal of the sampling section 1A. The subtracting section 1B outputs the subtraction-resultant signal as an offset-free signal indicating the angular speed of the car body.

A smoothing section (an averaging section) 2 smooths the output signal of the subtracting section 1B or temporally averages the output signal of the subtracting section 1B during a preset interval of time. Specifically, the smoothing section 2 calculates a mean value Bn among a given number of temporally spaced samples $A_n, A_{n-1}, A_{n-2}, \ldots$ represented by the output signal of the subtracting section 1B according to the following equation.

$$Bn = \sum_{i=0}^{m-1} A_{n-i}/m \qquad (1)$$

where "m" denotes the given sample number which corresponds to the preset averaging interval. The smoothing section 2 feeds the averaging-resultant signal to a switching section 4.

A deciding section 3 determines whether or not the car body is turning (rotating) by referring to the output signal of the subtracting section 1B. Specifically, the deciding section 3 calculates the absolute value of the quantity represented by the output signal of the subtracting section 1B. Then, the deciding section 3 compares the calculated absolute value with a predetermined threshold value X. When the calculated absolute value is greater than the predetermined threshold value X, the deciding section 3 regards the car body as turning (rotating). Otherwise, the deciding section 3 regards the car body as not turning (not rotating). The deciding section 3 generates a switch control signal depending on the result of the determination as to whether or not the car body is turning. The deciding section 3 outputs the switch control signal to the switching section 4.

The switching section 4 is connected between the averaging section 2 and the adaptively filtering section 5. The switching section 4 is opened and closed in response to the switch control signal fed from the deciding section 3. When the deciding section 3 finds the car body to be not turning, the switch control signal closes the switching section 4 so that the output signal from the smoothing section 2 is transmitted to the adaptively filtering section 5. When the deciding section 3 finds the car body to be turning, the switch control signal opens the switching section 4 so that the transmission of the signal from the smoothing section 2 to the adaptively filtering section 5 is inhibited.

The adaptively filtering section 5 generates the offset-representing signal from the output signal of the smoothing section 2. Specifically, in the case where the car body remains not turning, that is, in the case where the switching section 4 remains closed, the adaptively filtering section 5 periodically calculates the current value $C_n$ of the offset-representing signal from the immediately preceding value $C_{n-1}$ of the offset-representing signal and the current value Bn of the output signal of the smoothing section 2 by referring to the following equation.

$$C_n = C_{n-1} = \alpha \cdot Bn \tag{2}$$

where "$\alpha$" denotes a positive constant (a correction gain) predetermined in view of the balance between the accuracy and the speed of convergence of the adaptively filtering process. Accordingly, in this case, the adaptively filtering section 5 periodically updates the offset-representing signal.

When the car body turns, the switching section 4 is opened by the switch control signal fed from the deciding section 3. In this case, the transmission of the signal from the smoothing section 2 to the adaptively filtering section 5 is inhibited. On the other hand, the latest offset-representing signal continues to be fed from the adaptively filtering section 5 to the subtracting section 1B. To this end, the adaptively filtering section 5 has the function of holding the latest offset-representing signal.

As understood from the above description, even in the case where the car body moves along a straight path, the offset-representing signal is periodically updated so that the offset-representing signal can suitably follow a drift in the offset-components of the output signal from the sampling section 1A. Therefore, it is possible to adequately cancel the offset components of the output signal from the sampling section 1A even when the offset components drift.

Figure 4:
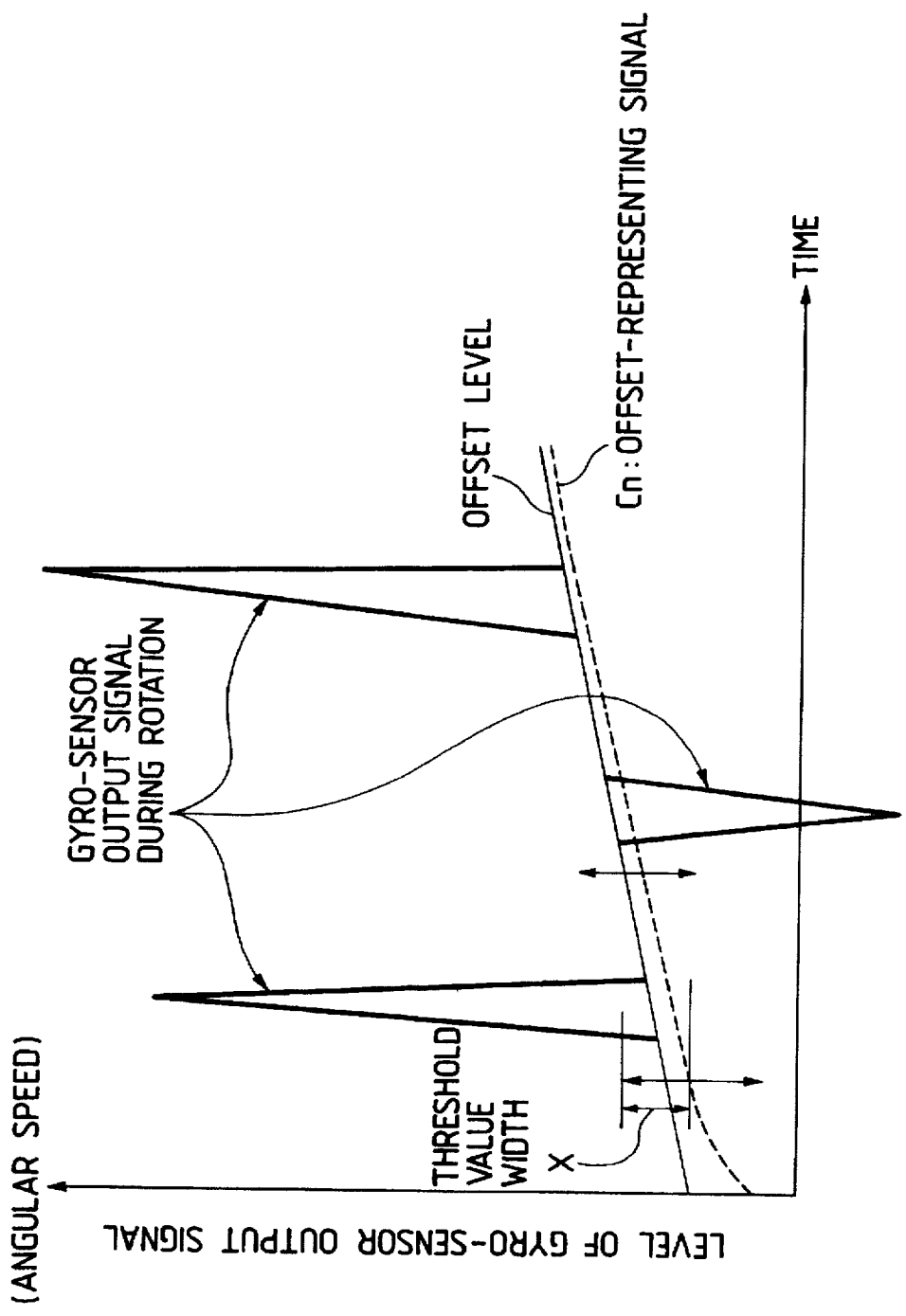
FIG. 4 is a time-domain diagram of a gyro-sensor output signal and an offset-representing signal in the offset-drift correcting device according to the first embodiment.

With reference to FIG. 4, the offset level (that is, the zero-point level) of the output signal from the gyro-sensor 1 tends to vary or drift as time goes by. In the case where the car body remains not turning, the difference between the offset-representing signal Cn and the output signal of the gyro-sensor 1 is provided by the subtracting section 1B, and the provided difference is temporally averaged by the smoothing section 2. In addition, the offset-representing signal Cn is periodically updated by the adaptively filtering section 5 in response to the output signal of the smoothing section 2.

As shown in FIG. 4, when the car body turns, the output signal from the gyro-sensor 1 deviates from the offset level. During the turn of the car body, the switching section 4 is opened so that the transmission of the signal from the smoothing section 2 to the adaptively filtering section 5 is inhibited. In addition, the offset-representing signal remains unchanged from the latest state, and the latest offset-representing signal continues to be fed from the adaptively filtering section 5 to the subtracting section 1B. Accordingly, during the turn of the car body, the output signal from the smoothing section 2 remains not used in the generation of the offset-representing signal while the updating of the offset-representing signal continues to be inhibited.

As a result, the offset-representing signal Cn suitably converges on the offset level (that is, the zero-point level) of the output signal from the gyro-sensor 1. Furthermore, the offset-representing signal promptly follows a drift in the offset level of the output signal from the gyro-sensor 1. Thus, during the generation of the offset-free signal indicating the angular speed of the car body, the offset components of the output signal from the gyro-sensor 1 can be adequately canceled even when the offset components drift.

Second Embodiment

A second embodiment of this invention is similar to the embodiment of FIGS. 2 and 3 except for an additional arrangement described hereinafter.

Figure 5:
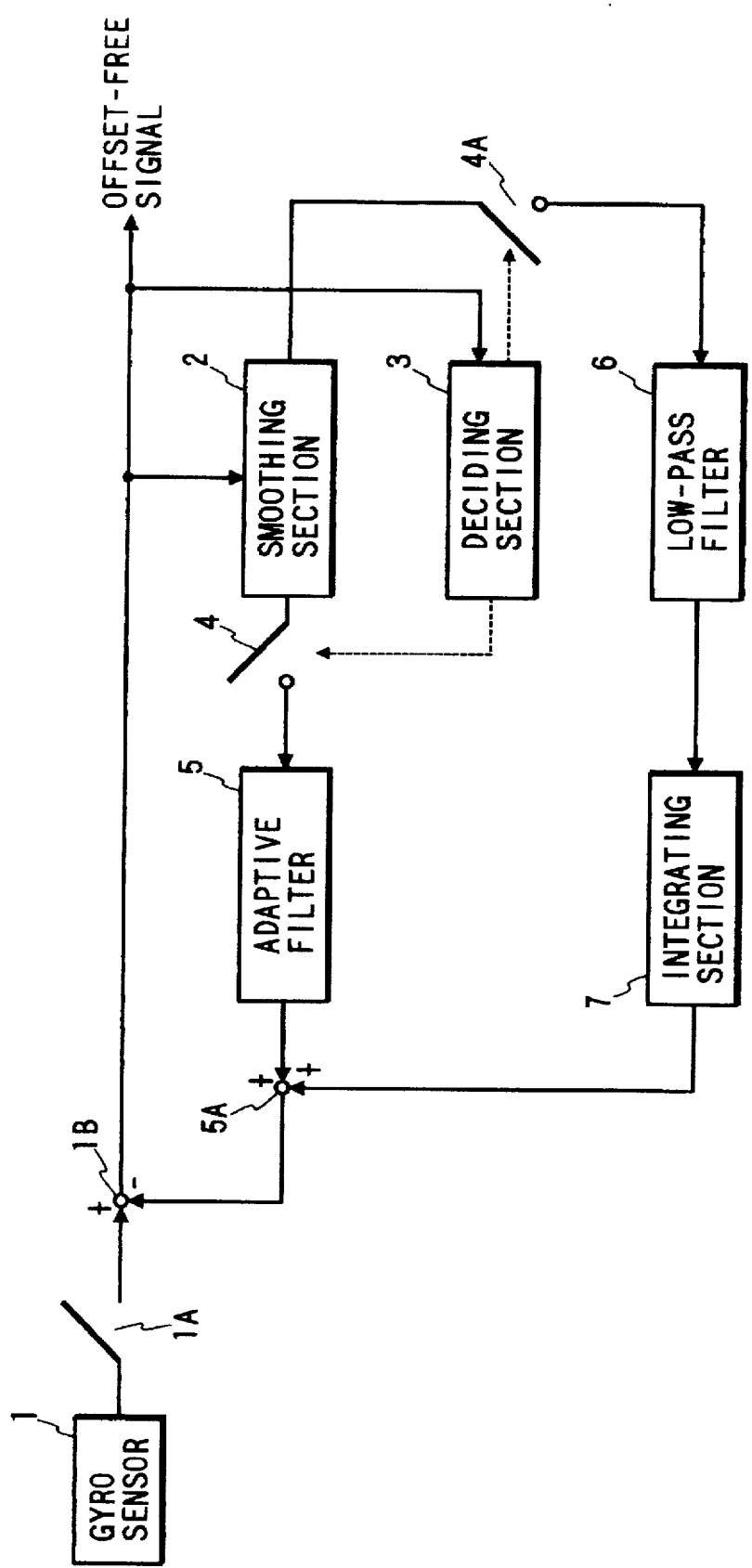
FIG. 5 is a flow diagram of the function of an offset-drift correcting device according to a second embodiment of this invention.

FIG. 5 is a flow diagram of the function of an offset-drift correcting device according to the second embodiment. With reference to FIG. 5, a switching section 4A, a low pass filtering section 6, an integrating section 7, and an adding section 5A sequentially follow a smoothing section 2. The switching section 4A is connected to a deciding section 3. The adding section 5A is connected between a subtracting section 1B and an adaptively filtering section 5.

The deciding section 3 feeds a switch control signal to the switching section 4A. The switching section 4A is opened and closed in response to the switch control signal. When the deciding section 3 finds a car body to be not turning, the switch control signal closes the switching section 4A so that the output signal from the smoothing section 2 is transmitted to the low pass filtering section 6. When the deciding section 3 finds the car body to be turning, the switch control signal opens the switching section 4A so that the transmission of the signal from the smoothing section 2 to the low pass filtering section 6 is inhibited.

The low pass filtering section 6 serves as a first-degree (first-order) filer of the IIR type. When the switching section 4A is closed, the low pass filtering section 6 processes the output signal of the smoothing section 2. Specifically, In the case where the car body remains not turning, that is, in the case where the switching section 4A remains closed, the low pass filtering section 6 periodically calculates the current value $D_n$ of a filter output signal from the immediately-preceding value $D_{n-1}$ of the filter output signal and the current value An of the output signal of the smoothing section 2 by referring to the following equation.

$$D_n = (1-W1) \cdot D_{n-1} = W1 \cdot An \tag{3}$$

where "W1" denotes a preset parameter determining the time constant of the low pass filtering section 6. The filter output signal means the filtering-resultant signal. The low pass filtering section 6 outputs the filtering-resultant signal to the integrating section 7.

The integrating section 7 integrates the output signal of the low pass filtering section 6 into an Integration-resultant signal. Specifically, the integrating section 7 periodically calculates the current value $E_n$ of the integration-resultant signal from the immediately-preceding value $E_{n-1}$ of the integration-resultant signal and the current value Dn of the output signal of the low pass filtering section 6 by referring to the following equation.

$$E_n = E_{n-1} = dt \cdot Dn \cdot \beta \tag{4}$$

where "dt" denotes a sampling period (that is, the interval between the moment of the occurrence of the current signal value and the moment of the occurrence of the immediately-preceding signal value), and "$\beta$" denotes an integration gain equal to a preset positive constant smaller than 1. The integrating section 7 outputs the integration-resultant signal to the adding section 5A.

The adding section 5A adds and combines the output signal of the adaptively filtering section 5 and the output signal of the integrating section 7 into an offset-representing signal. The adding section 5A outputs the offset-representing signal to the subtracting section 1B.

In the offset-drift correcting device of this embodiment, as a result of the operation of the low pass filtering section 6 and the integrating section 7, the offset-representing signal is able to promptly follow a high-rate drift in the offset level of the output signal from a gyro-sensor 1.

Third Embodiment

A third embodiment of this invention is similar to the embodiment of FIG. 5 except for an additional arrangement described hereinafter.

Figure 6:
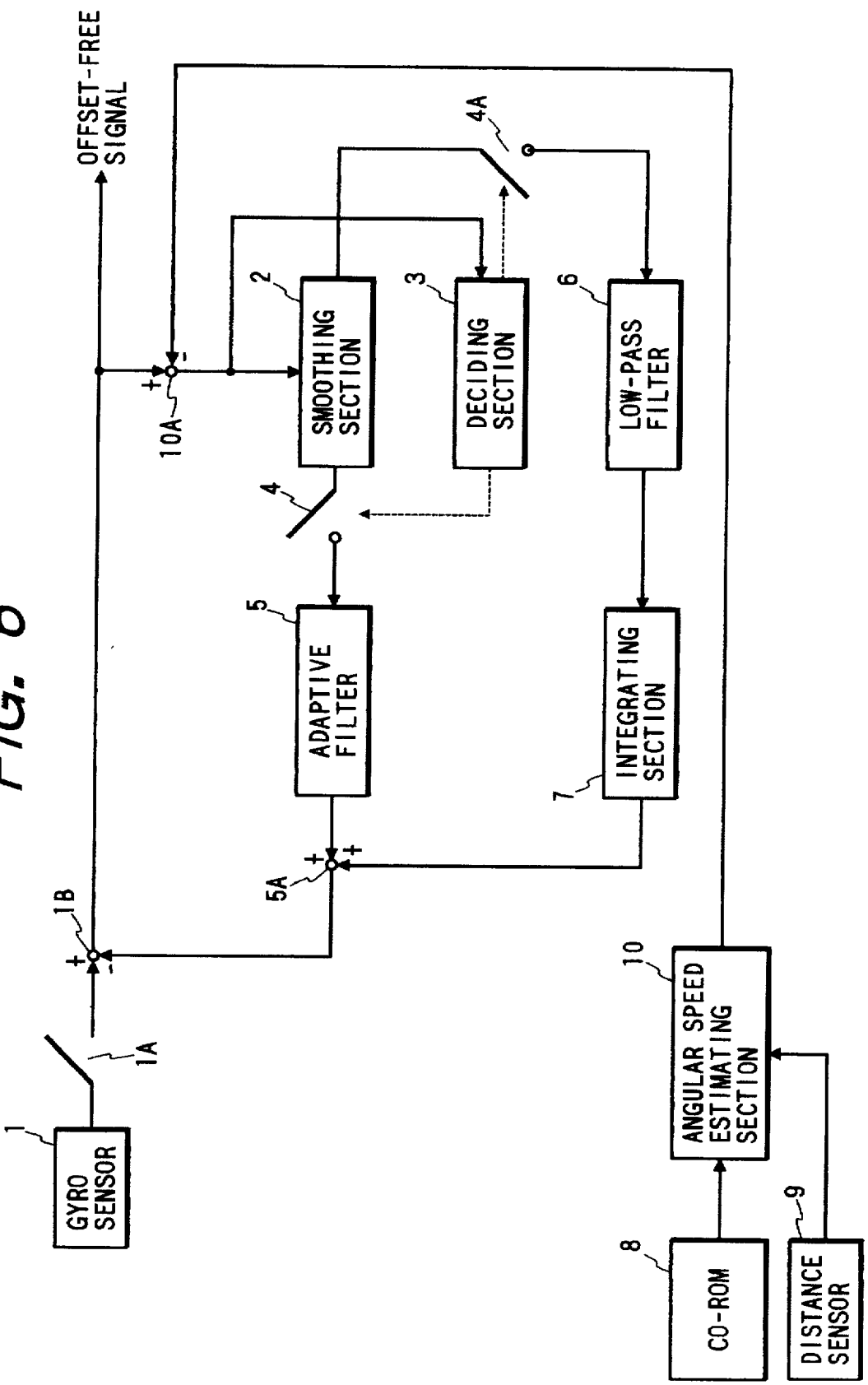
FIG. 6 is a flow diagram of the function of an offset-drift correcting device according to a third embodiment of this invention.

FIG. 6 is a flow diagram of the function of an offset-drift correcting device according to the third embodiment. With reference to FIG. 6, a subtracting section 10A is connected between a subtracting section 1B and a smoothing section 2. A deciding section 3 receives the output signal from the subtracting section 10A.

An angular-speed estimating section 10 receives the output signal of a CD-ROM drive 8 which represents digitized road map information. The angular-speed estimating section 10 derives information of a road, along which a car body is travelling, from the digitized road map information. The angular-speed estimating section 10 receives the output signal of a distance sensor 9 which represents the distance travelled by the car body. The angular-speed estimating section 10 estimates the angular speed of the car body in response to the road information and the distance information. The angular-speed estimating section 10 feeds the subtracting section 10A with a signal representing the estimated value of the angular speed of the car body.

The subtracting section 10A subtracts the output signal of the angular-speed estimating section 10 from the output signal of the subtracting section 1B. Thus, the estimated value of the angular speed of the car body is subtracted from the actual value of the angular speed of the car body which is represented by the output signal (the offset-free signal) of the subtracting section 1B. The subtracting section 10A feeds the subtraction-resultant signal to the smoothing section 2 and the deciding section 3.

When the car body is turning, the subtracting section 10A serves to cancel the turn-dependent components of the input signal to the smoothing section 2 and the deciding section 3. Accordingly, It is possible to prevent the operation of the smoothing section 2 and also the operation of the deciding section 3 from being adversely affected by turn of the car body. In addition, it is possible to reduce the number of types of turn of the car body which can be sensed by the deciding section 3. This number reduction results in an increase in the frequency of the occurrence of the updating of an offset-representing signal.

Figure 7:
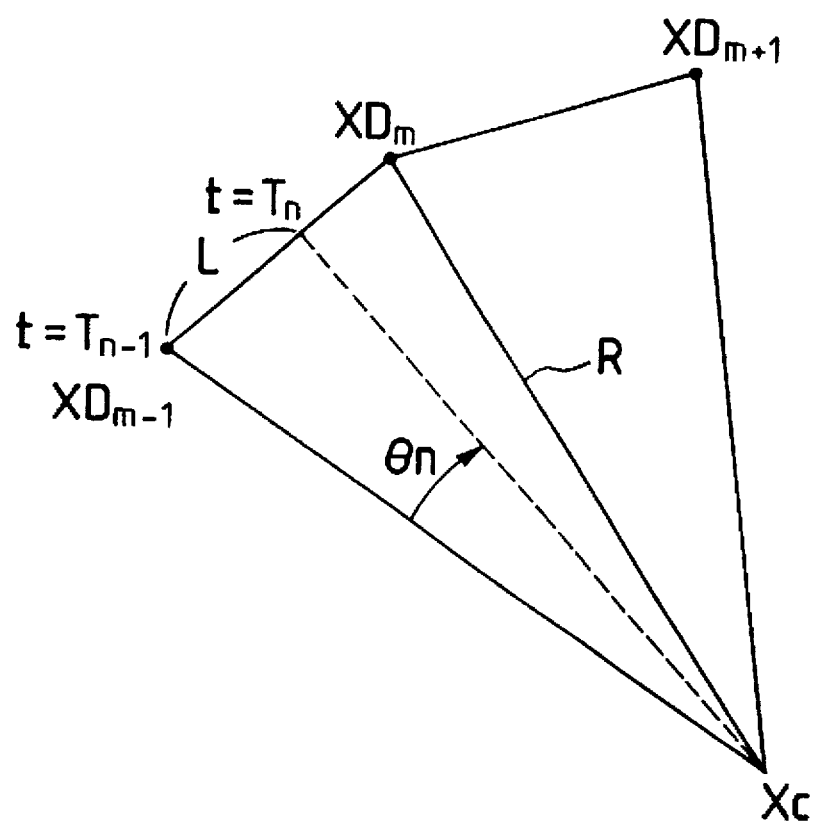
FIG. 7 is a diagram of end points $XD_{m-1}$, $XD_m$, and $XD_{m+1}$ in a road link, the center Xc of a circle whose circumference extends through the end points, the radius R of the circle, and an angular variation θn of a car body.

The operation of the angular-speed estimating section 10 will now be further described. With reference to FIG. 7, $XD_{m-1}$, $XD_m$, and $XD_{m+1}$ denote positions of end points in a road link while Xc denotes the coordinates of the center of a circle whose circumference extends through the points $XD_{m-1}$, $XD_m$, and $XD_{m+1}$. In addition, R denotes the radius of the circle, and the suffix "m" denotes a link order number.

It is now assumed that the position of the car body coincides with the position $XD_{m-1}$ at a moment $t=T_{n-1}$, and the position of the car body coincides with a position distant from the position $XD_{m-1}$ by a distance L at a subsequent moment $t=T_n$. In this case, the angular variation θn of the car body which occurs during the interval between the moments $T_{n-1}$ and $T_n$ is approximately calculated by referring to the following equation.

$$\theta n = L/(2 \cdot \pi \cdot R) \tag{5}$$

The angular speed ωn is calculated according to the following equation.

$$\omega n = \theta n/dt \tag{6}$$

where "dt" denotes a sampling period equal to the interval between the moments $T_{n-1}$ and $T_n$. In other words, $dt=(T_n-T_{n-1})$.

As the car body moves, the angular-speed estimating section 10 periodically calculates the turn radius R from the road map information concerning a road along which the car body is travelling. The angular-speed estimating section 10 derives the movement distance L from the output signal of the distance sensor 9. The angular-speed estimating section 10 estimates the angular speed of the car body in response to the turn radius R and the movement distance L by referring to the equations (5) and (6).

More than three end points may be used in determining the circle center Xc and the circle radius R. The points $XD_{m-1}$, $XD_m$, and $XD_{m+1}$ may be connected by an interpolation-resultant curved line such as a spline function line, and an angular variation of the car body may be calculated on the basis of the interpolation-resultant curved line.

Fourth Embodiment

A fourth embodiment of this invention is similar to the embodiment of FIG. 5 except for an additional arrangement described hereinafter.

Figure 8:
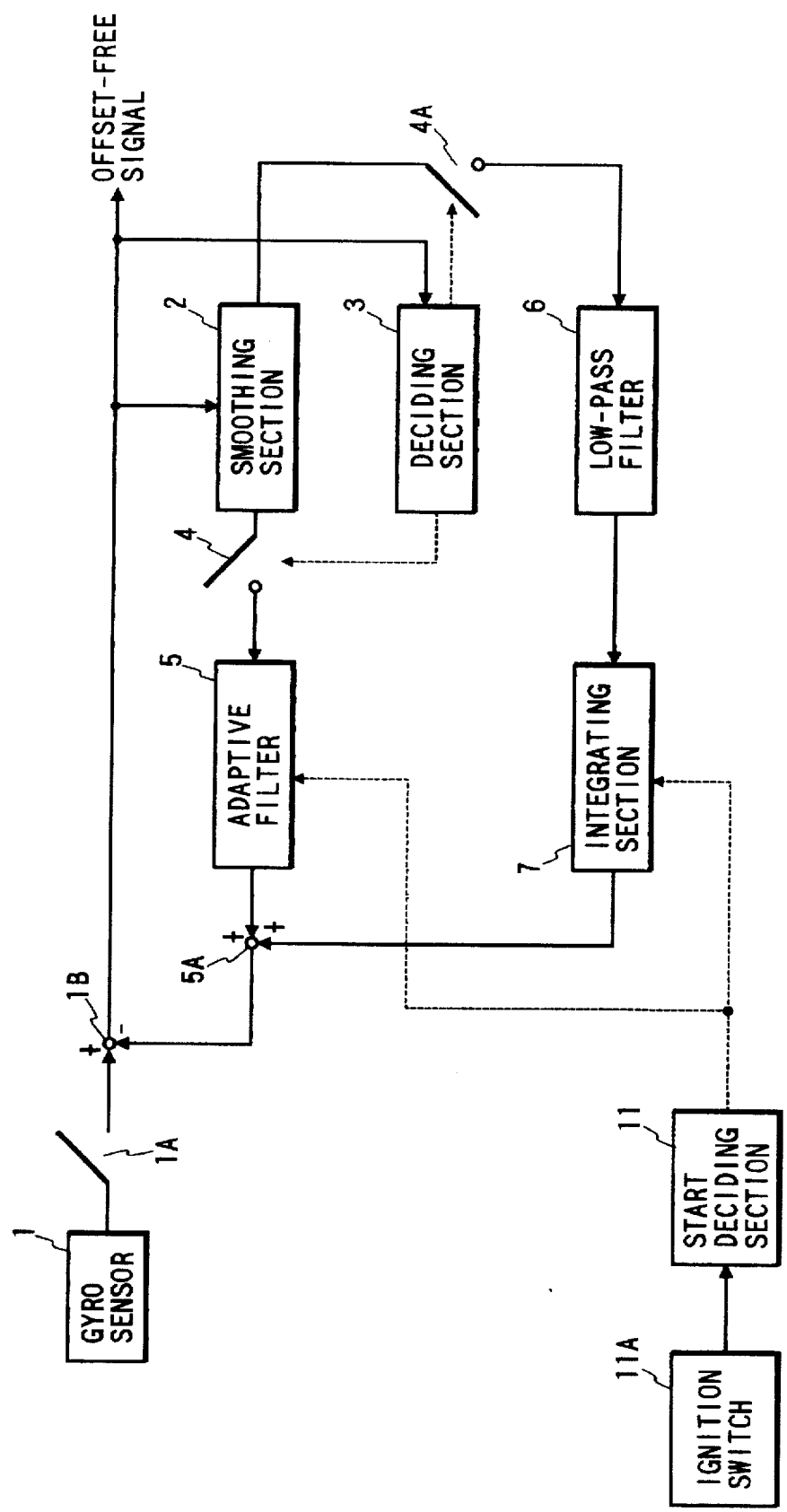
FIG. 8 is a flow diagram of the function of an offset-drift correcting device according to a fourth embodiment of this invention.

FIG. 8 is a flow diagram of the function of an offset-drift correcting device according to the fourth embodiment. With reference to FIG. 8, a start deciding section 11 is connected to an adaptively filtering section 5 and an integrating section 7.

The start deciding section 11 receives the output signal from a car engine-ignition switch 11A which indicates whether or not the car engine-ignition switch is in its on position. The start deciding section 11 determines whether or not the car engine-ignition switch 11A is moved to the on position to start a car engine by referring to the output signal from the car engine-ignition switch 11A. Since a gyro-sensor starts to be powered or activated when the car engine-ignition switch 11A is moved to the on position, the start deciding section 11 determines whether or not the activation of the gyro-sensor 1 is started. The start deciding section 11 generates a gain increasing signal when the activation of the gyro-sensor 1 is started. The start deciding section 11 continues to output the gain increasing signal to the adaptively filtering section 5 and the integrating section 7 during a given time (for example, several minutes) following the moment of the start of the activation of the gyro-sensor 1. When the given time terminates, the start deciding section 11 stops the outputting of the gain increasing signal.

The gain of the correction by the adaptively filtering section 5 is increased from a normal gain in response to the gain increasing signal fed from the start deciding section 11. When the gain increasing signal disappears, the gain of the correction by the adaptively filtering section 5 returns to the normal gain. The gain of the integration by the integrating section 7 is increased from a normal gain in response to the gain increasing signal fed from the start deciding section 11. When the gain increasing signal disappears, the gain of the integration by the integrating section 7 returns to the normal gain.

In the offset-drift correcting device of this embodiment, as a result of the operation of the start deciding section 11, an offset-representing signal is able to promptly follow a high-rate drift in the offset level of the output signal from the gyro-sensor 1 which occurs immediately after the start of the activation of the gyro-sensor 1.

Fifth Embodiment

A fifth embodiment of this invention is similar to the embodiment of FIG. 5 except for an additional arrangement described hereinafter.

Figure 9:
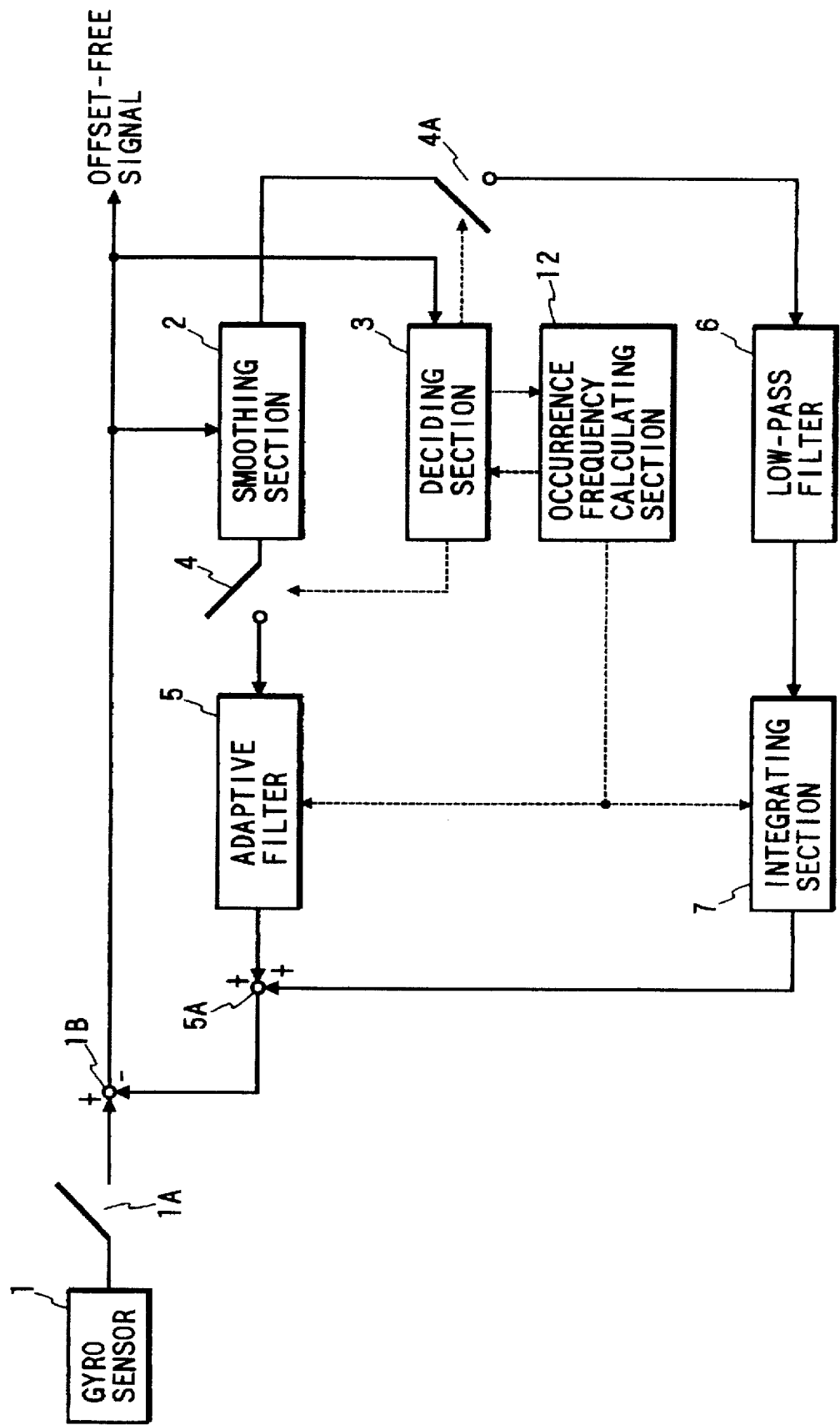
FIG. 9 is a flow diagram of the function of an offset-drift correcting device according to a fifth embodiment of this invention.

FIG. 9 is a flow diagram of the function of an offset-drift correcting device according to the fifth embodiment. With reference to FIG. 9, a correction-frequency calculating section 12 receives a flag Fint generated by a deciding section 3. The flag Fint is set to "1" when the deciding section 3 finds a car body to be not turning. The flag Fint is reset to "0" when the deciding section 3 finds the car body to be turning. The correction-frequency calculating section 12 serves as a low pass filter of the IIR type.

Specifically, the correction-frequency calculating section 12 periodically calculates a current correction-frequency $H_n$ from the immediately-preceding correction-frequency $H_{n-1}$ and the value of the flag Fint according to the following equation.

$$H_n = (1-W2) \cdot H_{n-1} + W2 \cdot Fint \tag{7}$$

where W2 denotes a preset value corresponding to a time constant of the low pass filter provided by the correction-frequency calculating section 12. The correction-frequency calculating section 12 feeds the deciding section 3, an adaptively filtering section 5, and an integrating section 7 with a signal representing the calculated correction-frequency $H_n$.

In the adaptively filtering section 5, a correction gain "α" is modified in response to the correction frequency $H_n$ as follows.

$$\alpha = \alpha o \cdot H_n / Ho \tag{8}$$

where "αo" denotes a standard correction gain (a normal correction gain) and Ho denotes a standard correction-frequency (a normal correction-frequency).

In the integrating section 7, an integration gain "β" is modified in response to the correction frequency $H_n$ as follows.

$$\beta = \beta o \cdot H_n / Ho \tag{9}$$

where "βo" denotes a standard integration gain (a normal integration gain).

In the deciding section 3, a threshold value X is modified in response to the correction frequency $H_n$ as follows.

$$X = Xo \cdot Ho / H_n \tag{10}$$

where Xo denotes a standard threshold value (a normal threshold value).

When the correction frequency $H_n$ drops, the threshold value X used in the deciding section 3 is increased to compensate for the drop in the correction frequency $H_n$. Simultaneously, the correction gain "α" used in the adaptively filtering section 5 and the integration gain "β" used in the integrating section 7 are decreased to compensate for a possible reduction in the accuracy of an offset-representing signal.

Sixth Embodiment

A sixth embodiment of this invention is similar to the embodiment of FIG. 5 except for an additional arrangement described hereinafter.

Figure 10:
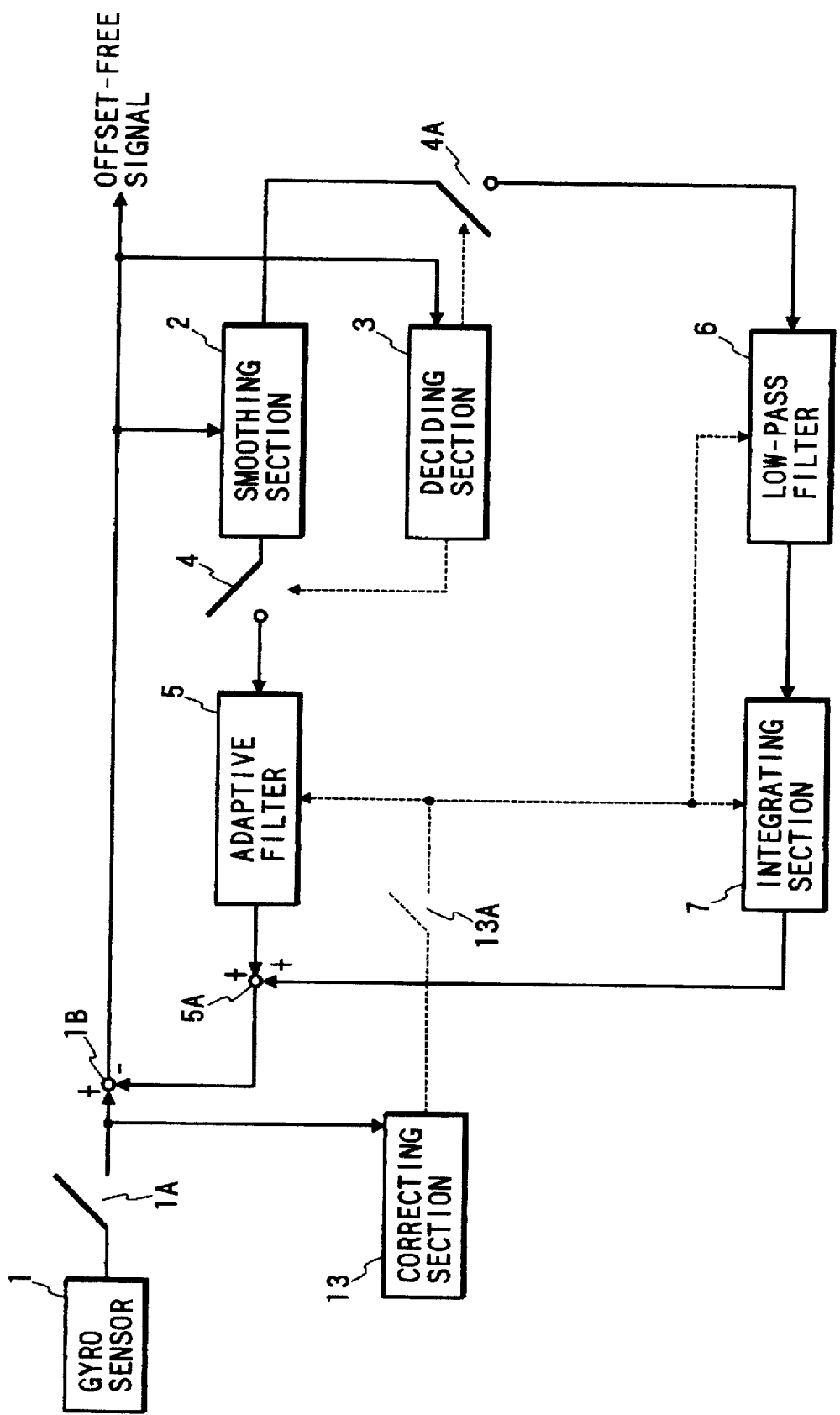
FIG. 10 is a flow diagram of the function of an offset-drift correcting device according to a sixth embodiment of this invention.

FIG. 10 is a flow diagram of the function of an offset-drift correcting device according to the sixth embodiment. With reference to FIG. 10, an offset-drift correcting section 13 receives the output signal from a sampling section 1A. The offset-drift correcting section 13 periodically calculates an offset level of the output signal from the sampling section 1A. The offset-drift correcting section 13 also periodically calculates a rate of a variation in the offset level which agrees with a drift level. The offset-drift correcting section 13 can feed information of the calculated offset level and the calculated drift level to an adaptively filtering section 5, a low pass filtering section 6, and an integrating section 7 via a switching section 13A. The offset-drift correcting section 13 can be the prior-art offset correcting device of FIG. 1.

The offset-level and drift-level information fed from the offset-drift correcting section 13 is used in initialization of the adaptively filtering section 5, the low pass filtering section 6, and the integrating section 7. Specifically, the current value $C_n$ of the output signal of the adaptively filtering section 5 is initialized to a value $F_n$ by referring to the following equation.

$$C_n = F_n \tag{11}$$

where the value $F_n$ is equal to the offset level represented by the information fed from the offset-drift correcting section 13. The current value $E_n$ of the output signal of the integrating section 7 is initialized to a value of "0" by referring to the following equation.

$$E_n = 0 \tag{12}$$

The current value $D_n$ of the output signal of the low pass filtering section 6 is initialized to a value $G_n$ by referring to the following equation.

$$D_n = G_n \tag{13}$$

where value $G_n$ is equal to the drift level represented by the information fed from the offset-drift correcting section 13.

The offset-drift correcting device of this embodiment has improved characteristics during an initial stage of operation.

Seventh Embodiment

FIG. 11 is a flow diagram of the function of an offset-drift correcting device according to a seventh embodiment of this invention which agrees with a combination of the embodiment of FIG. 8, the embodiment of FIG. 9, and the embodiment of FIG. 10.

What is claimed is:

1. An offset-drift correcting device for a gyro-sensor mounted on an object and outputting a signal representing an angular speed of the object, the device comprising:

first means for detecting whether or not the object is rotating;

second means connected to the gyro-sensor for smoothing the angular speed represented by the output signal of the gyro-sensor, and deriving an average angular speed of the object from the angular speed represented by the output signal of the gyro-sensor;

third means connected to the second means for calculating an amount of temporal variation in the average angular speed derived by the second means, wherein the third means comprises a low pass filter processing an output signal of the second means which represents the average angular speed;

fourth means connected to the third means for integrating an output signal of the third means which represents the calculated amount of temporal variation, and outputting a signal representing a result of the integrating;

fifth means connected to the first means and the second means for estimating a first offset level of the output signal of the gyro-sensor In response to the average angular speed derived by the second means in cases where the first means detects that the object is not rotating, wherein the fifth means comprises an adaptive filter processing the output signal of the second means which represents the derived average angular speed;

sixth means connected to the fourth means and the fifth means for combining the result of the integrating by the fourth means and the first offset level estimated by the fifth means into a second estimated offset level of the output signal of the gyro-sensor; and seventh means connected to the gyro-sensor and the sixth means for subtracting the second estimated offset level provided by the sixth means from the output signal of the gyro-sensor to convert the output signal of the gyro-sensor into an offset-free signal.

2. An offset-drift correcting device for a gyro-sensor mounted on an object and outputting a signal representing an angular speed of the object, the device comprising:

first means for estimating an angular speed of the object;

second means for subtracting the angular speed estimated by the first means from the angular speed represented by the output signal of the gyro-sensor, and outputting a signal representing a result of the subtracting;

third means connected to the second means for smoothing the output signal of the second means, and outputting a signal representing a result of the smoothing;

fourth means connected to the third means for estimating an offset level of the output signal of the gyro-sensor in response to the output signal of the third means, wherein the fourth means comprises an adaptive filter processing the output signal of the third means; and fifth means connected to the gyro-sensor and the fourth means for subtracting the offset level estimated by the fourth means from the output signal of the gyro-sensor to convert the output signal of the gyro-sensor into an offset-free signal.

3. The offset-drift correcting device of claim 1, further comprising:

eighth means for detecting whether or not the gyro-sensor starts to be powered; and ninth means connected to the fourth means, the adaptive filter, and the eighth means for modifying characteristics of the integrating by the fourth means and characteristics of the adaptive filter during a predetermined time following a moment at which the eighth means detects that the gyro-sensor starts to be powered.

4. The offset-drift correcting device of claim 1, further comprising:

eighth means for detecting a frequency of occurrence of updating of the first offset level estimated by the fifth means; and ninth means connected to the first means, the adaptive filter, and the eighth means for modifying characteristics of the detecting by the first means and characteristics of the adaptive filter in response to the frequency detected by the eighth means.

5. The offset-drift correcting device of claim 1, further comprising:

eighth means for determining desired initial conditions of the adaptive filter in response to the output signal of the gyro-sensor; and ninth means connected to the adaptive filter and the eighth means for setting the adaptive filter into the desired initial conditions determined by the eighth means when the adaptive filter starts to operate.

6. An offset-drift correcting device for a gyro-sensor mounted on an object and outputting a signal representing an angular speed of the object, the device comprising:

first means for detecting whether or not the object is rotating;

second means connected to the gyro-sensor for smoothing the angular speed represented by the output signal of the gyro-sensor, and deriving an average angular speed of the object from the angular speed represented by the output signal of the gyro-sensor;

third means connected to the second means for calculating an amount of temporal variation in the average angular speed derived by the second means, wherein the third means comprises a low pass filter processing an output signal of the second means which represents the average angular speed;

fourth means connected to the third means for integrating an output signal of the third means which represents the calculated amount of temporal variation, and outputting a signal representing a result of the integrating;

fifth means connected to the first means and the second means for estimating a first offset level of the output signal of the gyro-sensor in response to the average angular speed derived by the second means in cases where the first means detects that the object is not rotating, wherein the fifth means comprises an adaptive filter processing the output signal of the second means which represents the derived average angular speed;

sixth means connected to the fourth means and the fifth means for combining the result of the integrating by the fourth means and the first offset level estimated by the fifth means into a second estimated offset level of the output signal of the gyro-sensor;

seventh means connected to the gyro-sensor and the sixth means for subtracting the second estimated offset level provided by the sixth means from the output signal of the gyro-sensor to convert the output signal of the gyro-sensor into an offset-free signal;

eighth means for detecting whether or not the gyro-sensor starts to be powered;

ninth means connected to the fourth means, the adaptive filter, and the eighth means for modifying characteristics of the integrating by the fourth means and characteristics of the adaptive filter during a predetermined time following a moment at which the eighth means detects that the gyro-sensor starts to be powered;

tenth means for detecting a frequency of occurrence of updating of the first offset level estimated by the fifth means;

eleventh means connected to the first means, the adaptive filter, and the tenth means for modifying characteristics of the detecting by the first means and the characteristics of the adaptive filter in response to the frequency detected by the tenth means;

twelfth means for determining desired initial conditions of the adaptive filter in response to the output signal of the gyro-sensor; and thirteenth means connected to the adaptive filter and the twelfth means for setting the adaptive filter into the desired initial conditions determined by the twelfth means when the adaptive filter starts to operate.

* * * * *